United States Patent
Kikukawa et al.

(10) Patent No.: US 8,379,373 B2
(45) Date of Patent: Feb. 19, 2013

(54) VACUUM INSULATED SWITCHGEAR INCLUDING A BUS RECOVERY MEMBER

(75) Inventors: Shuichi Kikukawa, Hitachi (JP); Kenji Tsuchiya, Hitachi (JP); Masato Kobayashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 49 days.

(21) Appl. No.: 12/696,624

(22) Filed: Jan. 29, 2010

(65) Prior Publication Data

US 2010/0195273 A1  Aug. 5, 2010

(30) Foreign Application Priority Data

Jan. 30, 2009 (JP) ................... 2009-020527

(51) Int. Cl.
*H02B 7/00* (2006.01)
*H01H 33/66* (2006.01)

(52) U.S. Cl. ........... 361/605; 361/602; 218/10; 218/118
(58) Field of Classification Search .................. 361/602, 361/605, 601, 624; 218/10, 118
See application file for complete search history.

(56) References Cited

U.S. PATENT DOCUMENTS

| | | | |
|---|---|---|---|
| 7,457,105 B2* | 11/2008 | Kikukawa et al. | 361/605 |
| 7,813,109 B2* | 10/2010 | Kikukawa et al. | 361/612 |
| 7,897,890 B2* | 3/2011 | Kikukawa et al. | 218/140 |
| 8,008,594 B2* | 8/2011 | Kurogi et al. | 218/119 |
| 2009/0020507 A1* | 1/2009 | Kurogi et al. | 218/119 |
| 2010/0025376 A1* | 2/2010 | Kikukawa et al. | 218/118 |

FOREIGN PATENT DOCUMENTS

| | | |
|---|---|---|
| JP | 63146406 U | 9/1988 |
| JP | 4-107 U | 1/1992 |
| JP | 4161012 A | 6/1992 |
| JP | 07222314 | 8/1995 |
| JP | 2008-245409 | 10/2008 |

OTHER PUBLICATIONS

Korean Office Action dated Jun. 13, 2011, issued in Korean Patent Application No. 2010-7402 with partial English language translation.

Japanese Office Action mailed Jul. 31, 2012 in Japanese Patent Application No. 2009-020527 with partial English language translation.

* cited by examiner

*Primary Examiner* — Zachary M Pape
(74) *Attorney, Agent, or Firm* — Brundidge & Stanger, P.C.

(57) ABSTRACT

A vacuum insulated switchgear is arranged as a panel for a power substation with the other or the others in parallel rows. the vacuum insulated switchgear comprises a housing with a switch section, a bus section, a cable section, and a control section which are partitioned by earthed metal plates respectively. The vacuum insulated switchgear comprises: a connection member provided in each bus connecting part in the bus section of the each panel and enabling each bus to be connected and disconnected; and a bus recovery member which is detachably connected between the connection members of faultless panels adjacent to a faulty panel when the faulty panel occurred.

8 Claims, 9 Drawing Sheets

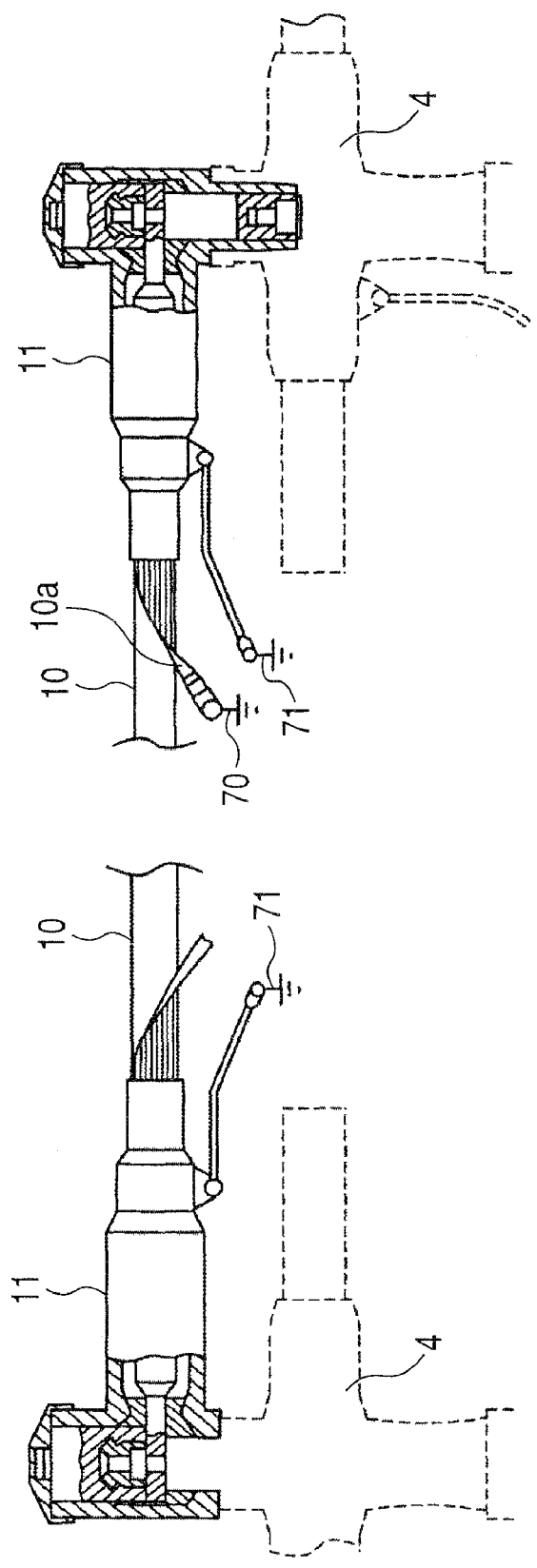

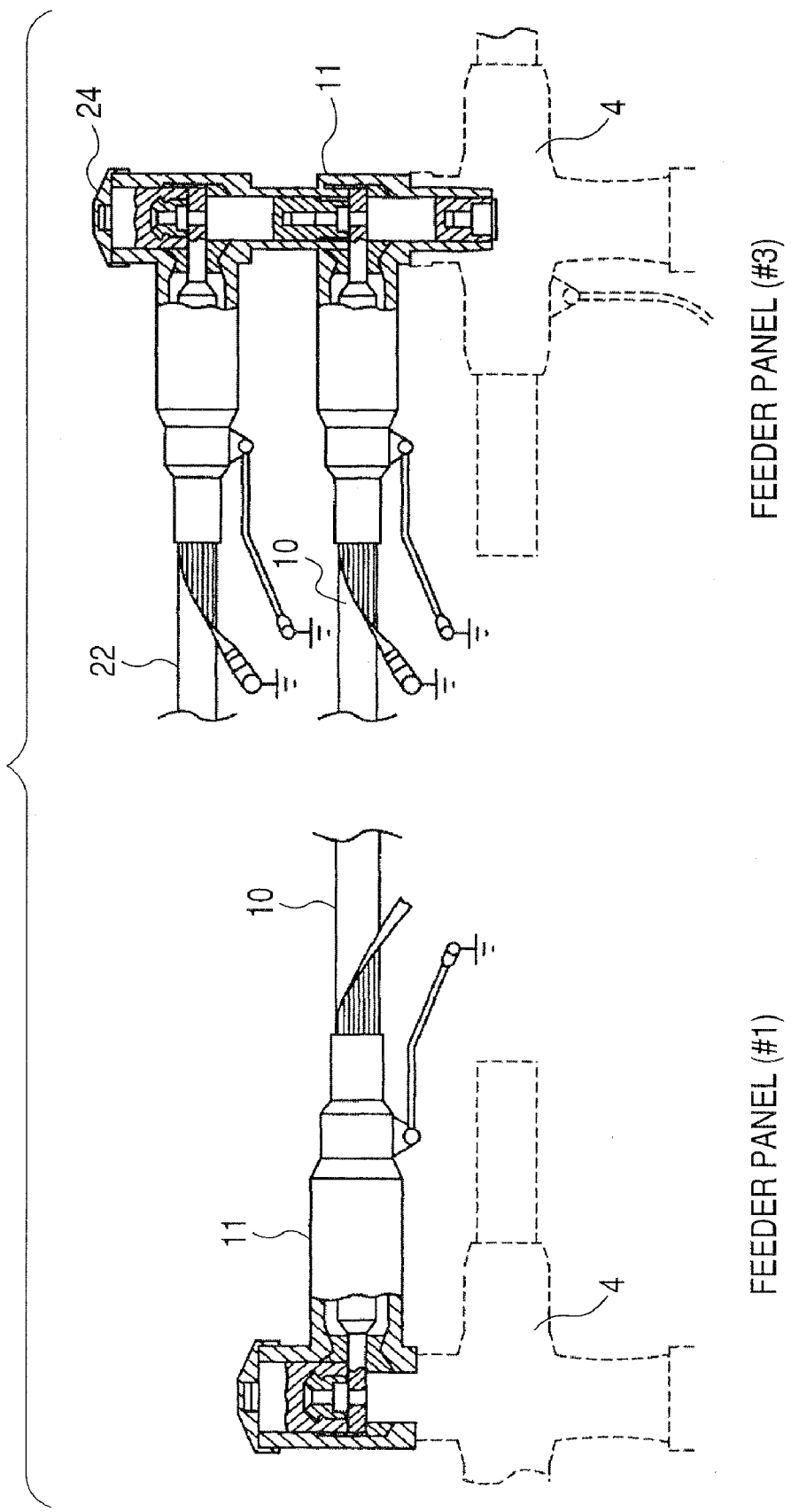

VACUUM INSULATED SWITCHGEAR INCLUDING A BUS RECOVERY MEMBER

CLAIM OF PRIORITY

The present application claims priority from Japanese application serial no. 2009-020527, filed on Jan. 30, 2009, the content of which is hereby incorporated by reference into this application.

FIELD OF THE INVENTION

The present invention relates to a vacuum insulated switchgear. In particular, it relates to the vacuum insulated switchgear used in a power substation.

BACKGROUND

Requests of users as to recent power substations have been diversified. That is, for example, in accordance with intended uses of customers of a power substation, types of loads and operating conditions differ from each other. Therefore, a distribution system is planned in consideration of safety, reliability, and operation maintainability required by customers, and increase of future load. In the distribution plan, control of a breaker, a disconnector, an earth switch, and the like forming the power substation, and monitoring and instrumentation of voltage, current, electrical power, and the like, need to be considered in accordance with needs of customers.

In this case, consideration of how to reduce installation spaces for the above mentioned devices such as the breaker, the disconnector, the earth switch and the like, controllers for the devices, and monitoring measurement hardware has been needed to suppress investment for the installation. In addition to this need, there are also further needed considerations such as removal of a faulty section at the site when part of the equipment should be out of order, ease of recovery operation including changing parts, and quickness of the recovery operation including power supply recovery.

In order to cope with these needs, there is provided a vacuum insulated switchgear comprising a vacuum double-break three-position type switch having breaking and disconnecting functions. A switch section having the switch and an operation device therein constitutes a unit separable from a housing of the vacuum insulated switchgear. The unitized switch section is selectively connected to and disconnected from a bus in a bus section and is movably provided in the housing (see, for example, JP-A-2008-245409).

For example, in the case of the power substation in which vacuum insulated switchgears constitute panels in parallel rows thereof, even if a fault occurs at one of the panels supplying power to an external load, its recovery operation is completed by replacing the switch section of the faulty panel with a backup switch section. Therefore, it becomes possible to recover the power supply for the entire power substation after a short interruption period.

However, for example, when the above substitute (backup) switch section is not prepared by a user or, even if it is prepared, when the faulty section of the panel includes a bus, even in the case of the above vacuum insulated switchgear, it may be difficult to recover the power supply of the entire power substation in a short time. The reason is that, in the power substation in which plural vacuum insulated switchgears arranged as panels in parallel rows, a bus of each panel (vacuum insulated switch gear) since is connected to an adjacent panel, in order to isolate the faulty section one of the panels from faultless other panels, an operation is required at a bus portion of the other panel or panels adjacent to the faulty panel.

When recovering the power supply of the entire power substation, a vacuum insulated switchgear is needed to enable recovery after a short interruption time even in the case where the recovery operation is also needed at the bus portion of the other panel adjacent to the faulty panel.

The present invention was made in view of the above mentioned-needs, and its object is to provide a vacuum insulated switchgear capable of being reduced in size and weight, reliable, and which enhances quick recovery of the entire facility when a fault occurs.

SUMMARY OF THE INVENTION (1) In order to achieve the above object, the present invention is configured the followings basically. That is, a vacuum insulated switchgear is to be arranged as a panel for a power substation with the other or the others in parallel rows, and the vacuum insulated switchgear comprises:

a housing having a switch section, a bus section, a cable section, and a control section which are partitioned by earthed metal plates respectively, a switch installed in the switch section, a bus installed in the bus section, and a cable connected with the switch and installed in the cable section. In addition to the arrangement, the vacuum insulated switchgear is characterized by further comprising:

a connection member provided in each bus connecting part in the bus section of the each panel and enabling each bus to be connected and disconnected, and a bus recovery member which is detachably connected between the connection members of faultless panels adjacent to a faulty panel when the faulty panel occurred.

(2) In item (1), the bus recovery member preferably comprises an elastic cable and cable adaptors provided at both ends of the elastic cable.

(3) In item (1) or (2), an internal conductor of the bus recovery member is preferably covered with a solid insulation material.

(4) In any one of items (1) to (3), a length of the bus recovery member is preferably set to be long enough to connect both ends of the panels placed side by side in the horizontal direction.

(5) In any one of items (1) to (4), the bus is preferably a solid insulation bus.

(6) In item (1), preferably, there are further provided an air insulated switchgear including a switch part having breaking and disconnecting functions, and a bus connected to the switch part, wherein the other end of the bus connecting member which is connected with the bus recovery member at one end is connected to the bus of the air insulated switchgear.

(7) In item (6), the other end of the bus connection member is preferably connected to a naked bus conductor of the air insulated switchgear through a connection conductor.

(8) In item (6) or (7), preferably, at the other end of the bus connection member, there is provided an air insulation terminal which has a frilled structure made of an insulation material on a peripheral surface of the internal conductor.

According to the vacuum insulated switchgear of the present invention, the bus connected to the faulty panel was removed, and both the panels adjacent to the faulty panel could be connected by the recovery cable which is the solid insulation bus recovery member. Therefore, it is possible to provide a vacuum insulated switchgear capable of being reduced in size and weight, reliable, and which enhances quick recovery of the entire facility when the fault occurs.

BRIEF DESCRIPTION OF THE DRAWINGS

FIG. 7 is a partial transverse cross section showing a connected state of a recovery cable which constitutes the first embodiment of the vacuum insulated switchgear;

FIG. 11 is a partial transverse cross section showing a connected state of a recovery cable constituting the second embodiment of the vacuum insulated switchgear.

DETAILED DESCRIPTION OF EMBODIMENTS

Now, with reference to the drawings, an embodiment of the vacuum insulated switchgear of the present invention will be described.

Figure 1:
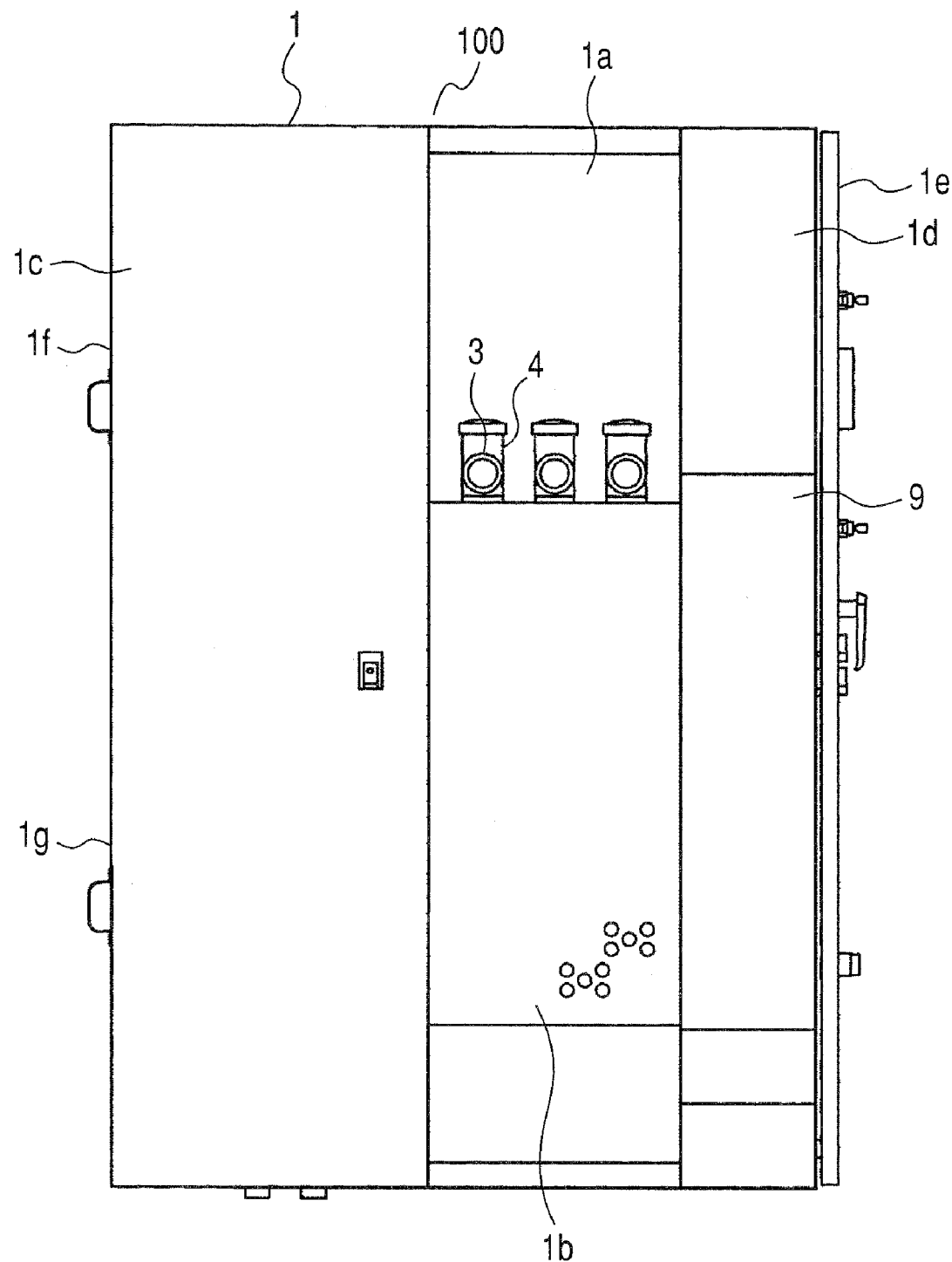
FIG. 1 is a side view showing a first embodiment of the vacuum insulated switchgear of the present invention.
Figure 2:
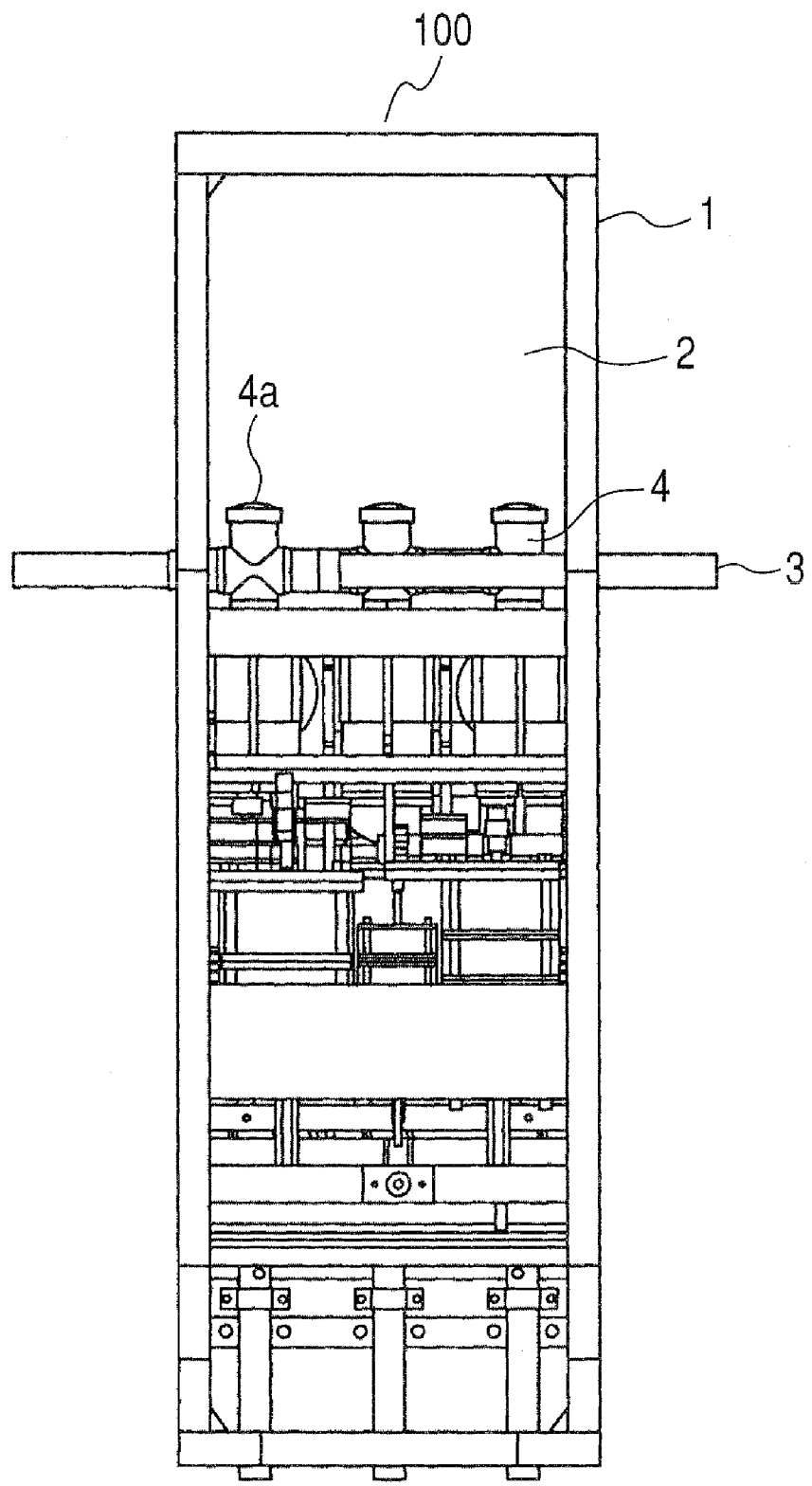
FIG. 2 is a front view of the first embodiment of the vacuum insulated switchgear in FIG. 1.
Figure 3:
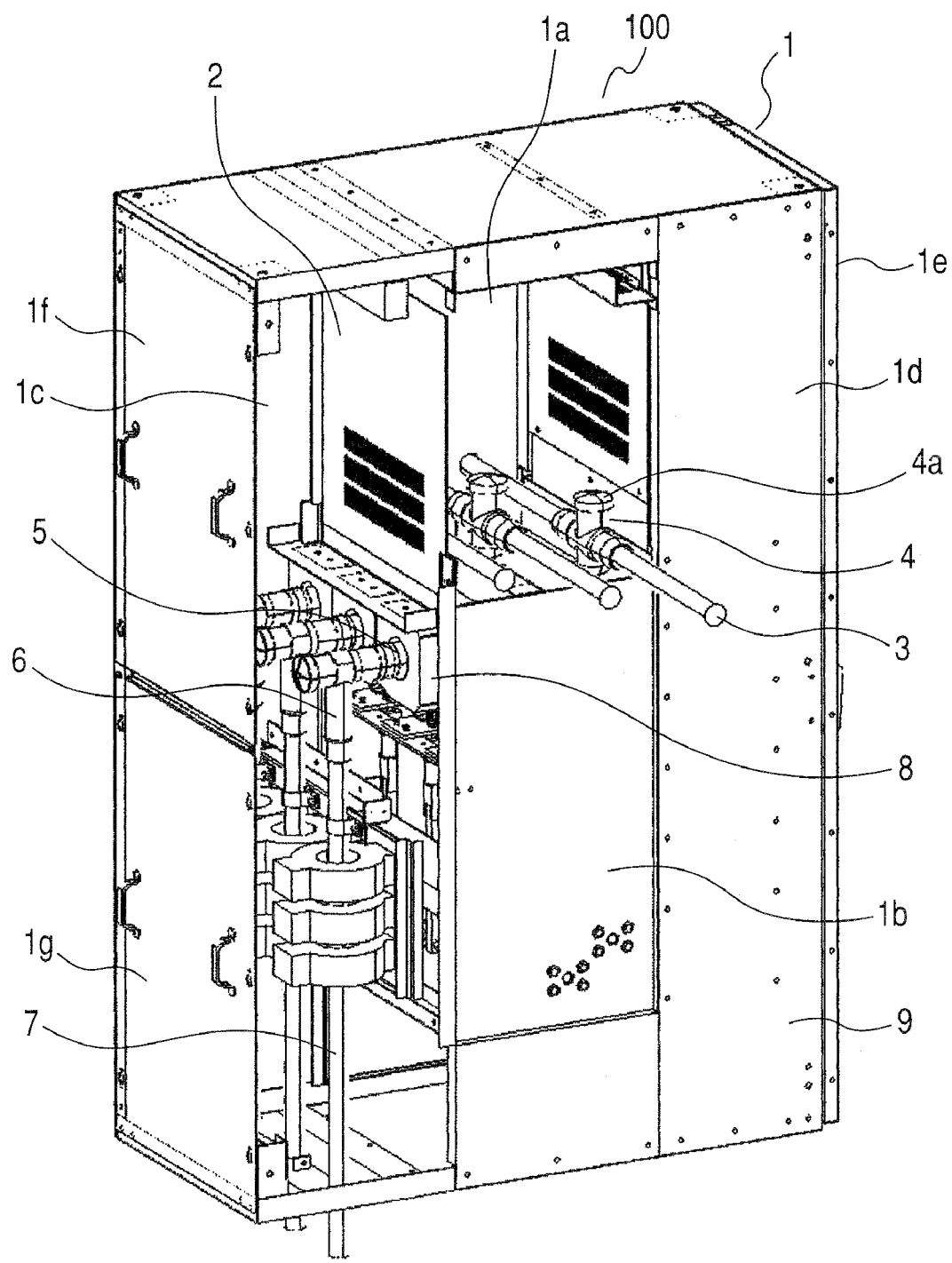
FIG. 3 is a perspective view showing the first embodiment of the vacuum insulated switchgear shown in FIG. 1.

FIGS. 1 to 3 show an embodiment of the vacuum insulated switchgear of the present invention. FIG. 1 is a side view showing the embodiment of the vacuum insulated switchgear, FIG. 2 is a vertical section view of the embodiment of the vacuum insulated switchgear shown in FIG. 1, and FIG. 3 is a perspective view of the embodiment of the vacuum insulated switchgear shown in FIG. 1.

In FIGS. 1 to 3, a housing 1 of the vacuum insulated switchgear 100 is divided into plural chambers as a bus section 1a, a switch section 1b, a cable section 1c, and a control section 1d, respectively, by a plurality of earthed metal plates being arranged inside the housing. Moreover, a front side (right side of FIG. 1) of the housing 1 is provided with a front door 1e, and a rear side (left side of FIG. 1) of the housing 1 is provided with an upper rear door 1f and a lower rear door 1g, respectively.

The bus section 1a is arranged on an upper side in a midway part between the control section 1d and the cable section 1c in the depth direction (horizontal direction of FIG. 1) of the housing 1. The switch section 1b is arranged below the bus section 1a, and the cable section 1c is arranged on the rear side (left side of FIG. 1) of the housing 1, respectively. Moreover, the control section 1d is arranged just behind the upper side of the front door 1e and is opposed to the bus section 1a.

As shown in FIG. 3, a bus-chamber partition plate 2 is provided on a border between an upper portion of the cable section 1c and the bus section 1a. In the bus section 1a, three-phase solid insulation buses 3 are arranged through connection adaptors 4 as connection members in parallel (orthogonal to the sheet in FIG. 1) with the front face of the housing 1. That is, each bus 3 is arranged over its own vacuum insulated switchgear (switchgear box) 100 and an adjacent vacuum insulated switchgear (omitted in FIGS), one end of the bus 3 is connected to a connection adaptor 4 of the vacuum insulated switchgear 100 and the other end is connected to a connection adaptor 4 of the adjacent vacuum insulated switchgear. Each bus 3 is used in an environment without a gas by being insulated with a solid insulation material. Since the gas maintenance is not necessary, usability of the switchgear is improved. Also, even if particulates or foreign matters enter the bus section 1a, the insulation is maintained and safety is ensured.

In a case that other vacuum insulated switchgears (switchgear boxes; omitted in FIGS) are arranged adjacent to both sides of the vacuum insulated switchgear 100, T-shaped connection adaptors for three phases are employed for the respective connection adaptors 4. These vacuum insulated switch gears corresponds to a power incoming panel and plural feeder panels (described at a later point in the text) shown in FIG. 4. That is, one ends of two buses 3 in each phase extending from the other vacuum insulated switchgears adjacent to both sides of the vacuum insulated switchgear 100 are connected to two bas-end outlets of each T-shaped connection adaptor 4 in the horizontal direction of the switchgear 100 respectively. Instead of that, in a case that the other vacuum insulated switchgear (switchgear box; omitted in FIGS) is arranged adjacent to only one side of the vacuum insulated switchgear 100, downward L-shaped connection adaptors for three phases are employed for the respective connection adaptor 4. That is, one end of the bus 3 in each phase extending from the one-side other vacuum insulated switchgear is connected to a bas-end outlet of each L-shaped connection adaptor in the horizontal direction of the switch gear. A first conical concave is formed in a lower interior of each connection adaptor 4, and each of three-phase switches can be electrically connected detachably to each of the bases by inserting a connection bushing of the switch section 1b to be described later to the connection adaptor 4 through the first conical concave. Moreover, an upper portion of the connection adaptor 4 is provided with a conical insulation stopper (not shown in FIGS) which is fixed into a second conical concave (not shown in FIGS) to cover an inside conductor of the connection adaptor 4 and an insulation cap 4a which covers an upper portion of the insulation stopper. The second conical concave as a connection part appears inside the upper portion of the connection adaptor 4 by removing the insulation cap 4a and the insulation stopper, and a cable adaptor for a recovery cable to be described later can be inserted into the second conical concave of the connection adaptor 4.

In this embodiment, the switch section 1b is configured with a unit in which a vacuum double-break three-position type switch (vacuum double-break three-position type breaker/disconnector), an earth switch and an operating device are mounted to a frame.

The cable section 1c is provided with: three-phase cable connecting terminals 5 each which is connected to a fixed contact of the vacuum double-break three-position type switch (vacuum double-break three-position type breaker/disconnector) and located in the cable section 1c; three-phase T-shaped cable heads 6 each which is rotatably attached to the cable connecting terminal 5; three-phase cables 7 each which is arranged on the upper side or lower side of the T-shaped cable head 6 by rotatable positioning of the T-shaped cable head 6 and connected to the cable connecting terminal 5; and system protection-current transformers 8 each which is provided around the cable connecting terminal 5. According to the present embodiment, each cable 7 is drawn from a bottom of the housing 1 into the cable section 1c.

The control section 1d has plural side plates 9 which close right and left side parts thereof and a front door 1e. For example, a control unit including a protective relay etc. is installed in the control section 1d.

According to the present embodiment, as described earlier the switch section 1b is configured with the unit in which the vacuum double-break three-position type switch (vacuum double-break three-position type breaker/disconnector), earth switch and operating device are mounted to the frame. Although not shown in FIGS, in the switch section 1b, the vacuum double-break three-position type switch and the earth switch are integrally joined to each other by a molded epoxy resin. Thus, the switch part is unitized and is reduced in size and weight. An outer surface of the molded epoxy resin is grounded by an applied conductive coating material and its safety of contact is secured.

The vacuum double-break three-position type switch described above comprises a vacuum container having an insulation tube, two fixed electrodes respectively accommodated in the vacuum container, and movable electrodes thereof thereby to constitute double breaking. In this example, the fixed electrodes are arranged on the upper side, and the movable electrodes which is connected to and disconnected from the fixed contacts are arranged on the lower side.

One fixed electrode of the switch is connected to and disconnected from the bus 3 in the bus section 1a through the connection bushing disposed to be drawn into the bus section 1a and the connection adaptor 4. Moreover, the other fixed electrode of the switch is connected to and disconnected from the T-shaped cable head 6 of the cable 7 in the cable section 1c through the connection bushing which is disposed to be drawn into the cable section 1c.

Figure 4:
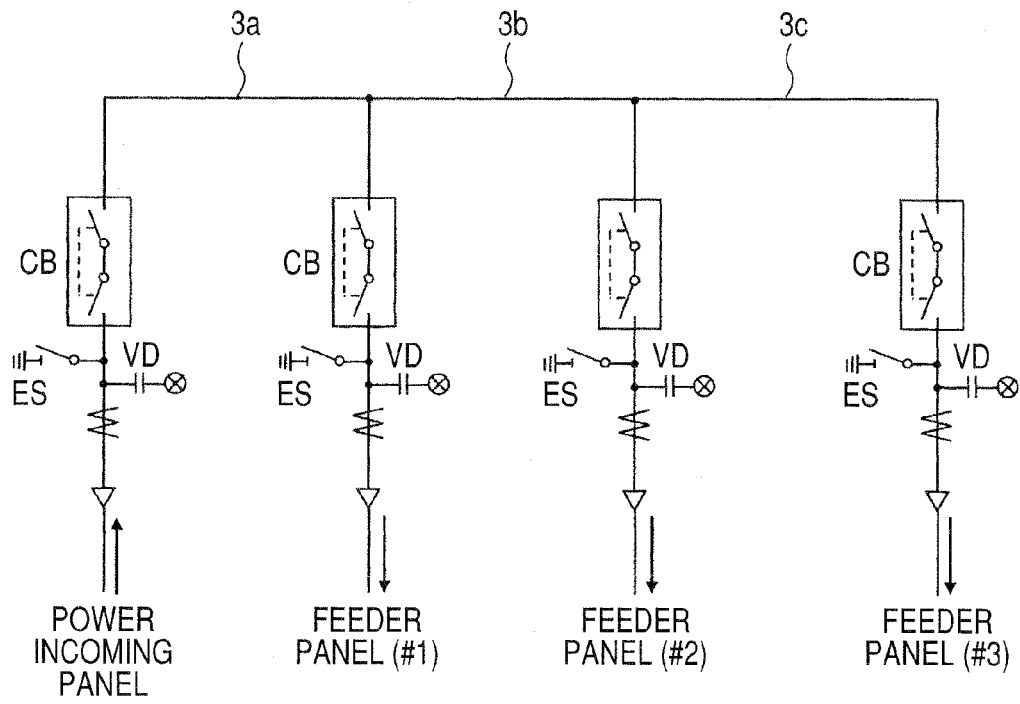
FIG. 4 is a diagram of an electric circuit of a power substation in which the first embodiment of the vacuum insulated switchgear is adopted as a feeder panel.

FIG. 4 shows a diagram of an electric circuit of a power substation for power-receiving and power-distributing, and the power substation is applied for four panels placed side by side as one embodiment of the vacuum insulated switchgear of the present invention described above. In FIG. 4, the power substation comprises, from the far left side of FIG. 4, a power incoming panel which receives power from the external device and, from the right thereof, a feeder panel (#1), a feeder panel (#2), and a feeder panel (#3) for supplying power to respective external loads. Moreover, the power incoming panel and the feeder panel (#1), the feeder panels (#1) and (#2), and the feeder panels (#2) and (#3) are connected by a bus 3a (three-phase BUS #1), a bus 3b (three-phase BUS #2), and a bus 3c (three-phase BUS #3), respectively so that the feeder panels (#1) to (#3) are connected in parallel rows to the power incoming panel.

Figure 5:
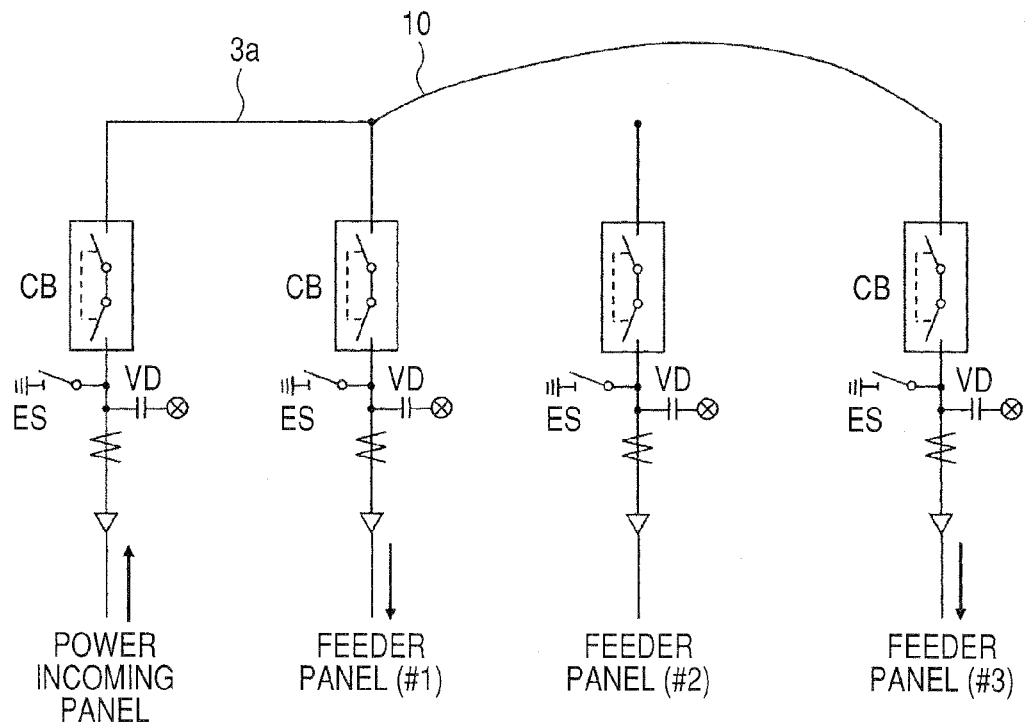
FIG. 5 is a diagram of an electric circuit explaining a fault recovery operation of the power substation in which the first embodiment of the vacuum insulated switchgear is adopted as a feeder panel.
Figure 8:
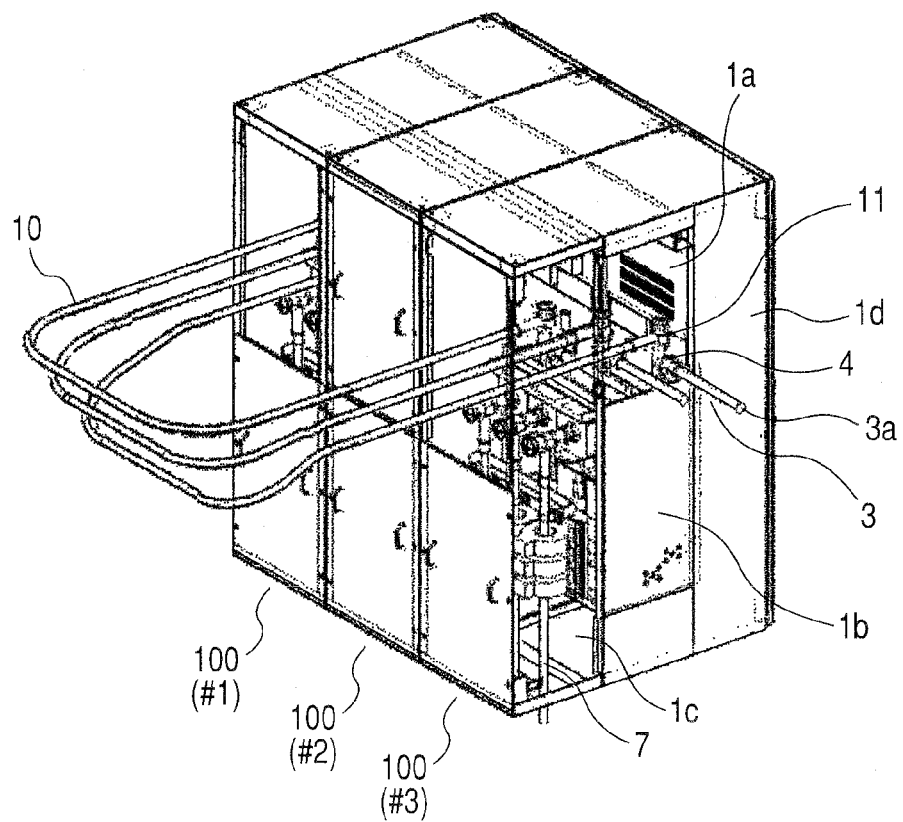
FIG. 8 is a perspective view showing a fault recovery state of the power substation shown in FIG. 5.
Figure 9:
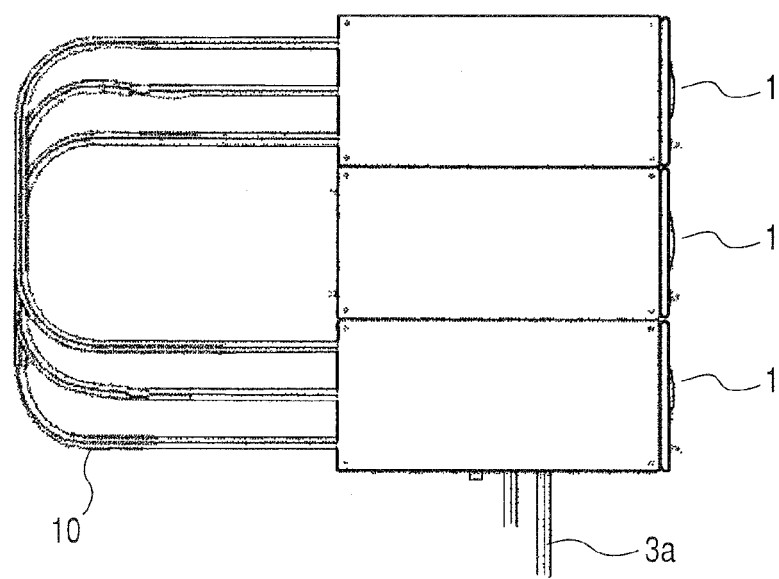
FIG. 9 is a plan view showing the fault recovery state of the power substation in FIG. 5.

Next, with reference to FIGS. 5 to 8, an explanation will be given of a recovery operation in case of a fault in the power substation in which one embodiment of the vacuum insulated switchgear of the present invention described above is adopted as feeder panels. FIG. 5 is a diagram of an electric circuit explaining a fault recovery operation of the power substation in which one embodiment of the vacuum insulated switchgear of the present invention is adopted as feeder panels. FIG. 6 is a perspective view explaining the fault recovery operation of the power substation shown in FIG. 5. FIG. 7 is a partial transverse cross section showing a connected state of a recovery cable which constitutes one embodiment of the vacuum insulated switchgear of the present invention. FIG. 8 is a perspective view showing a state of the fault recovery of the power substation shown in FIG. 5, and FIG. 9 is a plan view showing the state of the fault recovery of the power substation shown in FIG. 5. Since the parts in FIGS. 5 to 9 are assigned the same reference characters as the identical parts in FIGS. 1 to 4, detailed explanation thereof will be omitted.

In FIG. 5, a fault is assumed such that a faulty section includes the bus 3 inside the feeder panel (#2). For the quick recovery of the power substation, the principal object here is to give priority to the recovery of the power supply to external loads of the feeder panels (#1) and (#3), and to isolate the faulty section of the feeder panel (#2) from the panels in parallel rows in a short time. The fault recovery operation having such an object is carried out generally in following steps (i) to (v).

(i) Open the circuit breaker of the power incoming panel or the circuit breaker on an upper-row sender side to leave the power substation in an off state.

(ii) Remove the buses 3b (BUS #2) and 3c (BUS #3) connected to the feeder panel (#2).

(iii) Remove the faulty section in the feeder panel (#2).

(iv) As a power source for the feeder panel (#3), the bus 3 of the feeder panel (#1) and the bus 3 of the feeder panel (#3) are connected with a recovery cable 10 as a bus recovery member.

(v) The circuit breaker of the power incoming panel or the circuit breaker on the upper-row sender side is closed to recover the power of the power substation and to start supplying power to external loads.

FIG. 6 shows specific recovery steps of (iv) among the steps described above and corresponds to the perspective view of the feeder panel (#1) in FIG. 5.

Figure 6A:
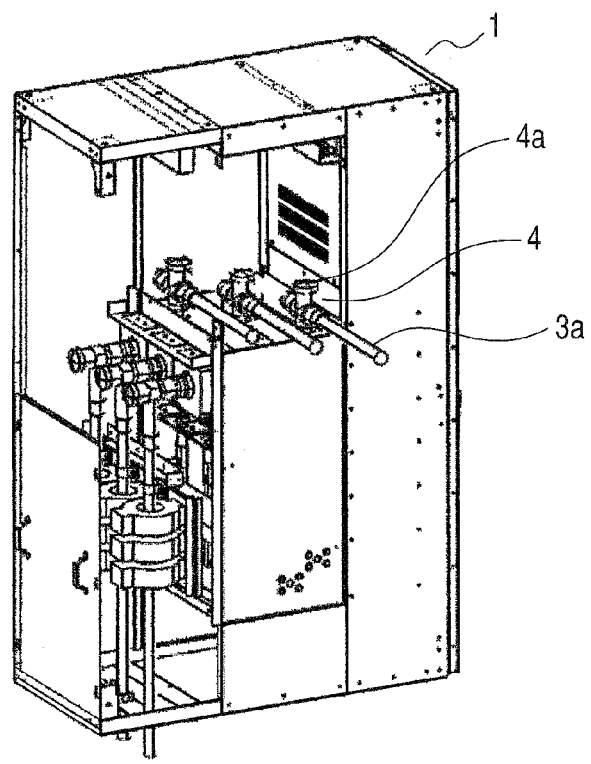
FIG. 6 is a perspective view explaining the fault recovery operation of the power substation shown in FIG. 5.

First, in FIG. 6(a), the bus 3b (BUS #2) connected to the feeder panels (#1) and (#2) is removed, and the upper rear door 1f and the bus-chamber partition plate 2 of the feeder panel (#1) are removed.

Figure 6B:
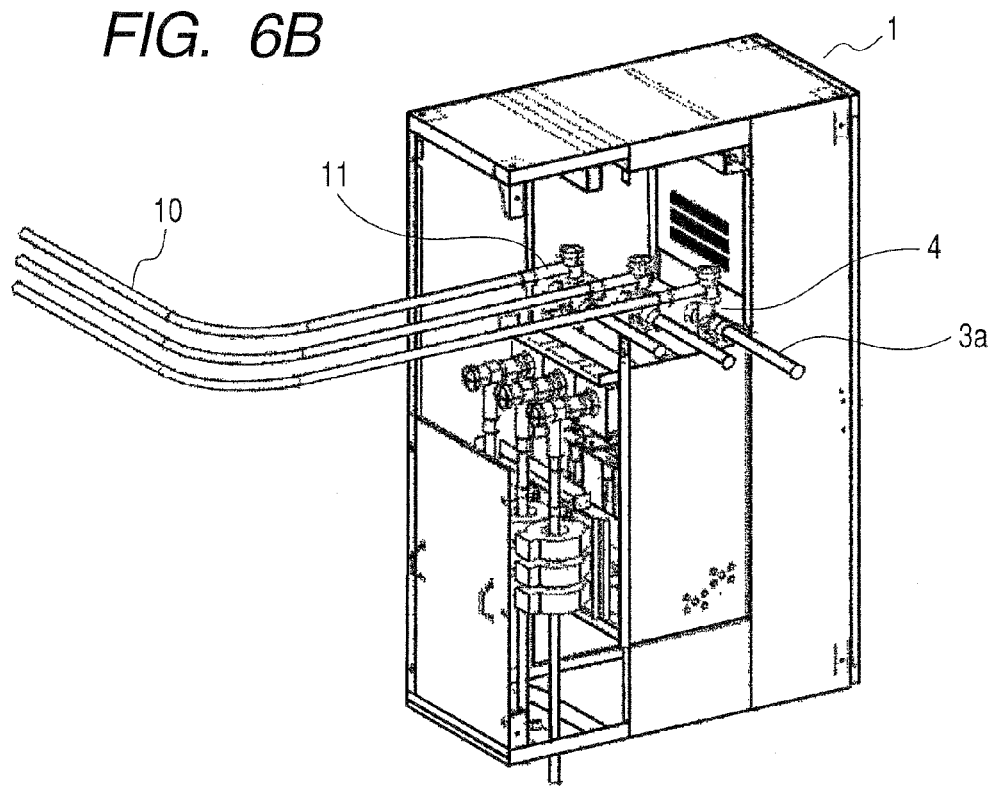

Next, the insulation cap 4a of the connection adaptor 4 of the feeder panel (#1) is removed, the insulation stopper is removed, and a convex portion of each cable adaptor 11 at one end of each recovery cable 10 as a bus recovery member is inserted into the conical concave inside the connection adaptor 4. FIG. 6(b) shows a state where the cable adaptor 11 at one end of the recovery cable 10 is fixed into the connection adaptor 4 of the feeder panel (#1). That is, the recovery cable 10 extends in a direction orthogonal to an extending direction of the solid insulation bus 3a (BUS #1). One end of the recovery cable 10 is connected with the cable adaptor 11 comprising a T-shaped cable head. Together with the cable adaptor 11, the recovery cable 10 are rotatable around an internal conductor in a horizontal plane.

An internal conductor of the recovery cable 10 is, for example, a more linear copper wire having elasticity. The peripheral surface of the copper wire is covered, for example, with an insulating rubber such as a silicon rubber. Further, the peripheral surface of the insulating rubber is covered with a conductive rubber of a ground potential. The recovery cable 10 of the present embodiment comprises the above cable adaptors 11 at its two ends. The length of the recovery cable 10 is set to be long enough to connect both ends of the panels in the horizontal direction of the power substation with panels in parallel rows.

Next, the upper rear door 1f of the feeder panel (#3) and the bus-chamber partition plate 2 are removed, the insulation cap 4a of the connection adaptor 4 of the feeder panel (#3) is removed, and the insulation stopper is removed. Further, a convex portion of the cable adaptor 11 at the other end of the recovery cable 10 is inserted into a conical concave inside the connection adaptor 4. Thus, the connection of the buses 3 between the feeder panels (#1) and (#3) is completed through the recovery cable 10. FIG. 7 is a partial transverse cross section which shows a connected state of the recovery cable 10 and the connection adaptor 4 in the feeder panels (#1) and (#3). As shown in FIG. 7, an outer cover 10a of the recovery cable 10 is grounded, for example, by connecting a grounding wire 70 to the housing on the feeder panel (#3) side alone. The adaptors 11 of the feeder panels (#1) and (#3) are grounded through a grounding wire 71 respectively, as in the case of the recovery cables 10.

FIGS. 8 and 9 show a state of the fault recovery of the power substation after carrying out the above steps. They show the state of the feeder panels in parallel rows except the power incoming panel in FIG. 5. FIG. 8 is a perspective view thereof, and FIG. 9 is a plan view thereof.

According to the embodiment of the vacuum insulated switchgear of the present invention described above, buses 3b (BUS #2) and 3c (BUS #3) connected to the faulty feeder panel (#2) are removed. Then, the feeder panel (#1) and the feeder panel (#3) adjacent to the faulty panel (#2) are allowed to be connected by the solid insulation recovery cable 10. Therefore, the arrangement of the embodiment can provide a vacuum insulated switchgear capable of being reduced in size and weight, reliable, and which can enhance quick recovery of the entire facility when an accident occurs.

Further, the solid insulation recovery cable 10 has a length enough to connect between two ends of the panels in the horizontal direction of the power substation comprising all feeder panels in parallel rows. Therefore, the embodiment can cope with faults of any panels in a safe manner. As a result of this, it becomes possible to shorten the work time for preparatory steps in the recovery operation and to enhance the quick recovery of the entire facility such as the power substation.

Figure 10:
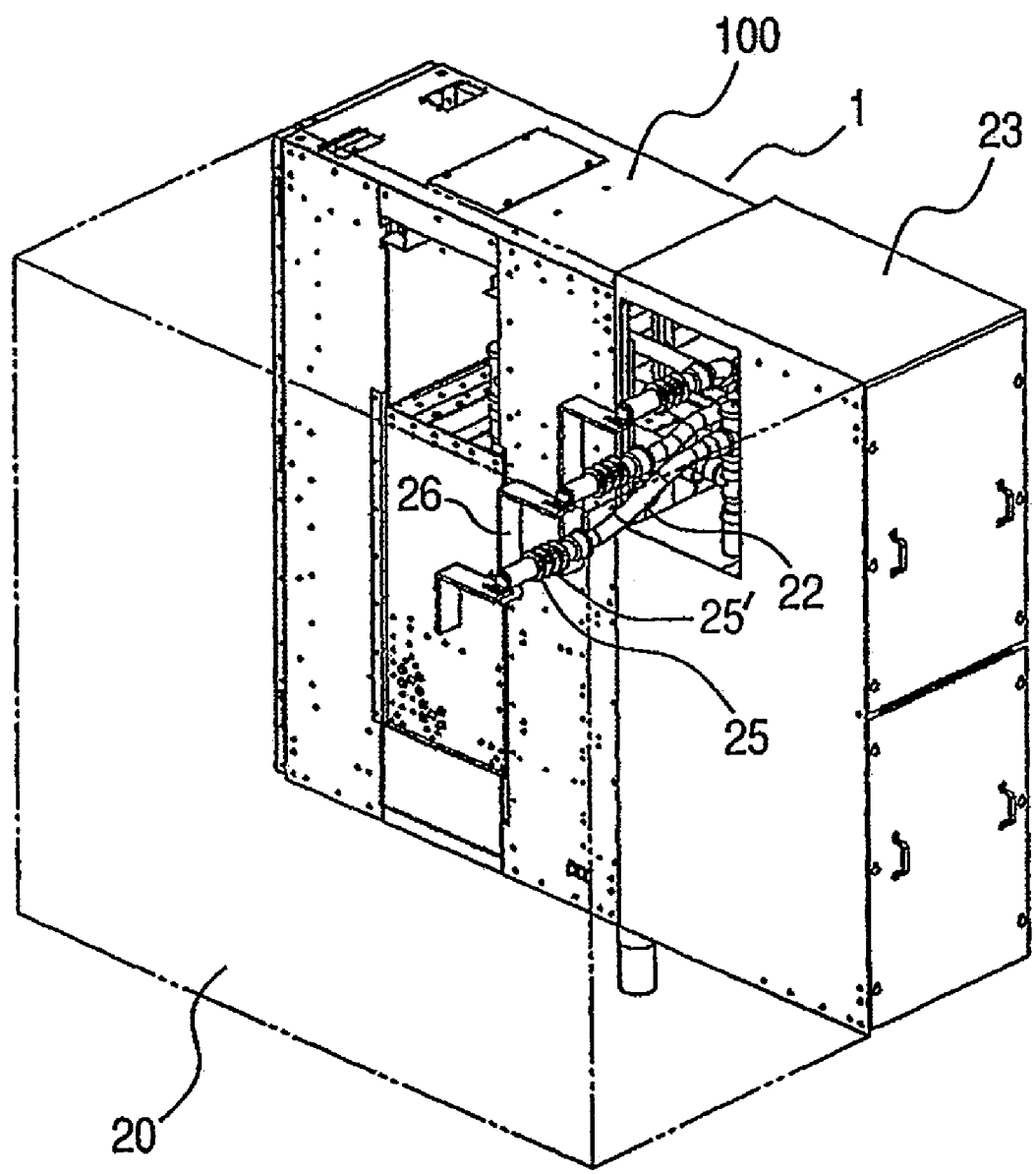
FIG. 10 is a perspective view showing an example of a connection arrangement between a second embodiment of the vacuum insulated switchgear of the present invention and an air insulated switchgear.

Next, with reference to FIGS. 10 and 11, a second embodiment of the vacuum insulated switchgear of the present invention will be described. FIG. 10 is a perspective view showing an example of a connection arrangement between the second embodiment of the vacuum insulated switchgear 100 and an air insulated switchgear 20, and FIG. 11 is a partial transverse cross section showing a connected state of the recovery cable constituting this embodiment of the vacuum insulated switchgear. The second embodiment of the vacuum insulated switchgear 100 has the same structure as that of the first embodiment of the vacuum insulated switchgear basically except for the matter of connection with the air insulated switchgear.

According to the above-mentioned first embodiment, its principal object although is to isolate the faulty section of the feeder panel (#2) of FIG. 5 from the other feeder panels in parallel rows in a short time for the purpose of enhancing quick recovery of the entire facility such as a power substation when the faulty occurred, in the present embodiment, furthermore, it has a principal object to recover the power supply to the external load having been provided by the feeder panel (#2) in a short time. That is, in a case where there is no substitute panel among the feeder panels in parallel rows of the vacuum insulated switchgear and there is provided an air insulated switchgear near the feeder panels in parallel rows of the vacuum insulated switchgear, the power to the external load given by the feeder panel (#2) is supplied with use of a substitute panel of the air insulated switchgear.

In FIG. 10, a reference number 20 is of the air insulated switchgear. In the air insulated switchgear 20, a switch part such as a vacuum breaker is accommodated therein to be the panel in an atmosphere. The switch part has functions of breaking and disconnecting. Though not shown, switch parts of vacuum breakers etc. accommodated in respective panels are electrically connected by air insulation busses. The reference number 100 is of a feeder panel (#3) of the vacuum insulated switchgear. These two switchgears 100 and 20 are arranged side by side being electrically connected with use of a connection cable 22 as a bus recovering member.

In the present embodiment, the size of the vacuum insulated switchgear 100 as the feeder panel in a fore-and-aft direction of the panel is formed shorter than the size of the air insulated switchgear 20 in a fore- and aft direction of the panel. Thereby, when these two are placed side by side, there is formed a space at the back of the panel of the vacuum insulated switchgear 100. Therefore, in this space, an accommodation panel 23 is disposed to accommodate the connection cable 22.

The connection cable 22 is constructed such that a more linear copper wire is used for the internal conductor to have elasticity, the copper wire is covered with an insulating rubber such as a silicon rubber, and the insulating rubber is covered with a conductive rubber of a ground potential. Further, the connection cable 22 of the present embodiment comprises a T-shaped cable head 24 as in the case of the cable adaptor 11 described above at one end. The other end of the connection cable 22 is connected to the air insulation terminal 25 which has a frilled structure 25' made of an insulation material on the peripheral surface of the internal conductor. Among the three phases of air insulation terminals 25, insulation distances necessary in the air are kept.

As shown in FIG. 11, the T-shaped cable head 24 at one end of the connection cable 22 can be, for example, connected to an upper portion of the cable adaptor 11 of the recovery cable 10 fixed into the connection adaptor 4 of the feeder panel (3). In this case, as in the case of the connection adaptor 4, an insulation cap of the cable adaptor 11 of the recovery cable 10 is removed, an internal insulation stopper is removed, and a convex portion of the T-shaped cable head 24 at one end of the connection cable 22 is inserted into a conical concave inside the cable adaptor 11. On the other hand, an air insulation terminal 25 to be connected to the other end of the connection cable 22 is connected with a naked bus conductor inside the air insulated switchgear 20 through a connection conductor 26.

According to the second embodiment of the vacuum insulated switchgear of the present invention described above, effects similar to the effects of the first embodiment described above can be obtained. At the same time, the panel of the vacuum insulated switchgear and the panel of the air insulated switchgear 20 can be connected with the solid insulation connection cable 22. Therefore, the power supply can be recovered quickly for the external load to which the faulty panel has been supplying power. As a result of this, it becomes possible to provide the vacuum insulated switchgear which enhances quick recovery of the entire facility even when any faults occur.

Also, the air insulation terminal 25 of the solid insulation connection cable 22 has a frilled portion 25' made of the insulation material. Therefore, an insulation distance defined by the insulation part becomes longer corresponding to the length of the frilled portion 25' between the naked bus conductor inside the air insulated switchgear 20 and the conductive rubber of the connection cable 22 of a ground potential. Thus, even if the entire length of the air insulation terminal 25 itself is shortened, a short circuit can be prevented and components can be reduced in size.

What is claimed is:

1. A system of multiple vacuum insulated switchgears arranged in a row, the vacuum insulated switchgears being used as respective panels for a power substation, and each of the vacuum insulated switchgears comprising:
- a housing having a switch section, a bus section, a cable section, and a control section which are partitioned by earthed metal plates respectively,
- a switch installed in the switch section,
- a bus installed in the bus section, one end of the bus being connected to a bus connecting part of its own panel and the other end being connected to a bus connecting part of an adjacent panel, and
- a bus recovery member, connected with the switch and at least partly installed in the cable section,
- wherein the system further comprises:
- the bus connecting part in the bus section of each panel and enabling the bus to be connected thereto and disconnected therefrom, and
- the bus recovery member configured so as, upon occurrence of a fault in one of the panels, to be detachably connected between the connection part of faultless panels adjacent to the faulty panel bypassing the faulty panel.

2. The system according to claim 1, wherein the bus recovery member comprises an elastic cable and cable adaptors provided at both ends of the elastic cable.

3. The system according to claim 1,
wherein an internal conductor of the bus recovery member is covered with a solid insulation material.

4. The system according to claim 1,
wherein a length of the bus recovery member is set to be long enough to connect both ends of the panels placed side by side in the horizontal direction.

5. The system according to claim 1,
wherein the bus is a solid insulation bus.

6. The system according to claim 1, further comprising, in addition to the arrangement of vacuum insulated switchgears, an air insulated switchgear including a switch part having breaking and disconnecting functions, and a bus connected to the switch part at one end,
wherein the system is configured such that, upon occurrence of the fault in one of the panels, one end of a connection cable is electrically connected to the other end of the bus of the air insulated switchgear and the other end of the connection cable is connected to the bus recovery member through the bus connecting part to use the air insulated switchgear as a substitute panel for the faulty panel of the vacuum insulated switchgears.

7. The system according to claim 6, wherein the other end of the connection cable is electrically connected to a naked bus conductor of the air insulated switchgear through a connection conductor.

8. The system according to claim 6,
wherein the other end of the connection cable is provided with an air insulation terminal which has a frilled structure made of an insulation material on a peripheral surface of the internal conductor of the connection cable.

* * * * *